United States Patent
Huang et al.

(10) Patent No.: US 11,821,782 B2
(45) Date of Patent: Nov. 21, 2023

(54) LOAD CELL FOR MEASURING A LOADING FORCE UNDER A SPECIFIC RANGE WITH LIMITATION ELEMENT TO PREVENT IRREVERSIBLE DEFORMATION

(71) Applicant: Delta Electronics, Inc., Taoyuan (TW)

(72) Inventors: Yu-Xian Huang, Taoyuan (TW); Yi-Min Liang, Taoyuan (TW); Chieh-Huang Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 186 days.

(21) Appl. No.: 17/241,931

(22) Filed: Apr. 27, 2021

(65) Prior Publication Data

US 2022/0082432 A1 Mar. 17, 2022

Related U.S. Application Data

(60) Provisional application No. 63/079,568, filed on Sep. 17, 2020.

(51) Int. Cl.
*G01G 23/00* (2006.01)
*G01L 1/22* (2006.01)

(52) U.S. Cl.
CPC .......... *G01G 23/005* (2013.01); *G01L 1/2231* (2013.01)

(58) Field of Classification Search
CPC .... G01L 1/2231; G01L 5/1627; G01G 23/005
See application file for complete search history.

(56) References Cited

U.S. PATENT DOCUMENTS

| | | | | |
|---|---|---|---|---|
| 3,365,689 A | * | 1/1968 | Ali | G01L 1/2231 73/862.632 |
| 3,771,359 A | * | 11/1973 | Shoberg | G01L 5/1627 73/862.382 |
| 4,283,941 A | * | 8/1981 | Kutsay | G01L 1/2225 73/862.635 |
| 4,961,696 A | * | 10/1990 | Yamamura | B29C 45/5008 425/149 |

(Continued)

FOREIGN PATENT DOCUMENTS

| CN | 1283985 C | 11/2006 |
|---|---|---|
| CN | 201165062 Y | 12/2008 |

(Continued)

*Primary Examiner* — Natalie Huls
(74) *Attorney, Agent, or Firm* — KIRTON McCONKIE; Evan R. Witt

(57) ABSTRACT

The disclosure relates to a load cell including an elastic element, at least one strain gauge and a limitation element. The elastic element includes a first end portion, a second end portion and a deformation region. The first end portion and the second end portion are arranged along an axial direction and opposed to each other. The deformation region is located between the first end portion and the second end portion. The at least one strain gauge is disposed in the deformation region. When a force is exerted on the first end portion in a first direction, the deformation region is deformed to drive the at least one strain gauge to change shape, so that the force is measured and standardized under a specific range. The limitation element is connected to the elastic element. A gap is formed between the limitation element and the elastic element.

14 Claims, 14 Drawing Sheets

(56) References Cited

U.S. PATENT DOCUMENTS

| | | | | |
|---|---|---|---|---|
| 5,111,702 | A * | 5/1992 | Antkowiak | G01L 1/26 73/862.635 |
| 5,209,936 | A * | 5/1993 | Ihara | B29C 45/5008 425/149 |
| 5,349,871 | A * | 9/1994 | Naganuma | G01L 1/2231 73/862.635 |
| 6,005,199 | A | 12/1999 | Harada et al. | |
| 6,461,139 | B1 * | 10/2002 | Yokoya | B29C 45/5008 425/149 |
| 6,769,897 | B2 * | 8/2004 | Eppich | B30B 15/047 425/149 |
| 8,726,741 | B2 | 5/2014 | Krippner et al. | |
| 2005/0000304 | A1 * | 1/2005 | Smith | G01L 1/2243 73/862.637 |
| 2008/0156113 | A1 | 7/2008 | Hehl | |
| 2021/0325264 | A1 * | 10/2021 | Endo | B25J 13/085 |

FOREIGN PATENT DOCUMENTS

| | | | |
|---|---|---|---|
| CN | 102672987 B | 1/2015 | |
| CN | 10285905 A | 9/2019 | |
| DE | 232758 A5 * | 10/1984 | ............ G01L 1/268 |
| TW | M442500 U | 12/2012 | |
| WO | 2020/158166 A1 | 8/2020 | |

\* cited by examiner

LOAD CELL FOR MEASURING A LOADING FORCE UNDER A SPECIFIC RANGE WITH LIMITATION ELEMENT TO PREVENT IRREVERSIBLE DEFORMATION

CROSS-REFERENCE TO RELATED APPLICATION

This application claims the benefit of U.S. Provisional Application No. 63/079,568 filed on Sep. 17, 2020, and entitled "LOAD CELL FOR INJECTION MOLDING MACHINE". The entireties of the above-mentioned patent application are incorporated herein by reference for all purposes.

FIELD OF THE INVENTION

The present disclosure relates to a load cell, and more particularly to a disc-type load cell capable of measuring a loading force under a specific range through the support of a limitation element and the limited displacement of a gap, and preventing the load cell from being damaged by irreversible permanent deformation due to overload.

BACKGROUND OF THE INVENTION

A load cell has a function of converting a force such as tension, compression, pressure or torque into an electrical signal that can be measured and standardized. As the force exerted on the load cell increases, the electrical signal changes proportionally. A strain gauge load cell is the kind most often found in industrial settings. It is ideal as it is highly accurate, versatile, and cost-effective. Structurally, a conventional strain gauge load cell includes an elastic element and a strain gauge. The strain gauge is secured on the elastic element. The elastic element is usually made of aluminum, alloy steel or stainless steel which makes it very sturdy but also minimally elastic. When a force is exerted on the load cell, the elastic element is slightly deformed, and the shape of the strain gauge secured on the elastic element is also changed, so as to change the resistance of the strain gauge. The resulting alteration to the resistance of the strain gauge is measured as voltage. Since the change in voltage is proportional to the amount of the force exerted on the load cell, the amount of the load force can be calculated from the output of the load cell.

However, the conventional load cell performs a measurement in a specific range along a specific direction. For example, a conventional disc-type load cell is used to measure the axial force during the injection molding process. When the force exerted on the load cell exceeds a special range, the elastic element is overloaded, and the elastic element such as the disc structure is deformed and damaged irreversibly.

Therefore, there is a need of providing a disc-type load cell capable of measuring a loading force under a specific range, and preventing the load cell from being damaged by irreversible permanent deformation due to overload, so as to obviate the drawbacks encountered from the prior arts.

SUMMARY OF THE INVENTION

It is an object of the present disclosure to provide a disc-type load cell capable of measuring a loading force under a specific range, and preventing the load cell from being damaged by irreversible permanent deformation due to overload. In order to avoid the irreversible permanent deformation and the material damage of the load cell due to overload, a limitation element with a special design is introduced into the structure of the load cell, and a gap is formed between the limitation element and the elastic element, so that the load cell is deformed in a specific space. Under the effects of the support of the limitation element and the limited displacement of the gap, it prevents the load cell from being damaged due to overload deformation. In addition, since the gap spatially corresponds to the strain gauge secured on the elastic element, when a sealant is filled into the gap to cover the strain gauge, it is helpful of protecting the strain gauge from being damaged by moisture or dust.

In accordance with one aspect of the present disclosure, a load cell is provided and includes an elastic element, at least one strain gauge and a limitation element. The elastic element includes a first end portion, a second end portion and a deformation region. The first end portion and the second end portion are arranged along an axial direction and opposed to each other. The deformation region is located between the first end portion and the second end portion. The at least one strain gauge is disposed in the deformation region. When a force is exerted on the first end portion in a first direction, the deformation region is deformed to drive the at least one strain gauge to change shape, so that the force is measured and standardized under a specific range. The limitation element is connected to the elastic element. A gap is formed between the limitation element and the elastic element.

In an embodiment, the deformation region and the at least one strain gauge are arranged along a second direction, and the second direction is different from the first direction.

In an embodiment, the elastic element includes a first main body, a second main body and a connection portion, the second main body is disposed around an outer periphery of the first main body, the first main body and the second main body are concentric with each other, and the connection portion is connected between the first main body and the second main body, wherein the first end portion and the second end portion are formed on the first main body and the second main body, respectively, and the deformation region is formed on the connection portion.

In an embodiment, each of the first main body, the second main body and the connection portion is formed in a ring shape, and the first main body, the connection portion and the second main body are sequentially disposed along a radial direction.

In an embodiment, the first end portion is a stressed end located at a top surface of the first main body, and the second end portion is a mounted end located at a bottom surface of the second main body.

In an embodiment, the first end portion and the second end portion are misaligned in the axial direction, and the gap spatially corresponds to the first end portion.

In an embodiment, the deformation region and the at least one strain gauge are extended along the axial direction.

In an embodiment, the elastic element includes a first main body, a second main body and a connection portion, the first main body and the second main body are stacked in the axial direction and concentric with each other, and the connection portion is connected between the first main body and the second main body, wherein the first end portion and the second end portion are formed on the first main body and the second main body, respectively, and the deformation region is formed on the connection portion.

In an embodiment, each of the first main body, the second main body and the connection portion is formed in a ring shape.

In an embodiment, the first end portion is a stressed end located at a top surface of the first main body, and the second end portion is a mounted end located at a bottom surface of the second main body.

In an embodiment, the first end portion and the second end portion are opposed to each other in the axial direction, and the gap is located between the first end portion and the second end portion.

In an embodiment, the at least one strain gauge includes a plurality of strain gauges arranged radially in the deformation region and served as a bridge circuit, which is configured to convert the force into an electrical signal.

In an embodiment, the gap includes a spaced distance, and the spaced distance is inversely proportional to the force, wherein when the spaced distance is reduced to zero, the force is greater than the specific range, and the elastic element is supported by the limitation element to limit deformation of the deformation region.

In accordance with another aspect of the present disclosure, a load cell is provided. The load cell includes a first main body, a second main body, a connection portion, at least one strain gauge and a limitation element. The first main body includes a first end portion. The second main body includes a second end portion. The connection portion is connected between the first main body and the second main body and includes a deformation region. The first end portion and the second end portion are arranged along an axial direction. The at least one strain gauge is disposed in the deformation region. When a force is exerted on the first end portion in a first direction, the deformation region is deformed to drive the at least one strain gauge to change shape, so that the force is measured and standardized under a specific range. The limitation element is connected to the second main body. A gap is formed between the limitation element and the first main body.

In an embodiment, each of the first main body, the second main body and the connection portion is formed in a ring shape, and the first main body, the connection portion and the second main body are sequentially disposed along a radial direction.

In an embodiment, the first end portion is a stressed end located at a top surface of the first main body, and the second end portion is a mounted end located at a bottom surface of the second main body, wherein the first end portion and the second end portion are misaligned in the axial direction, and the gap spatially corresponds to the first end portion.

In an embodiment, each of the first main body, the second main body and the connection portion is formed in a ring shape, wherein the first main body, the connection portion and the second main body are stacked in the first direction.

In an embodiment, the first end portion is a stressed end located at a top surface of the first main body, and the second end portion is a mounted end located at a bottom surface of the second main body, and the gap is located between the first end portion and the second end portion.

In an embodiment, the at least one strain gauge includes a plurality of strain gauges arranged radially in the deformation region and served as a bridge circuit, which is configured to convert the force into an electrical signal.

In an embodiment, the gap includes a spaced distance, and the spaced distance is inversely proportional to the force, wherein when the spaced distance is reduced to zero, the force is greater than the specific range, and the first main body is supported by the limitation element to limit deformation of the deformation region.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
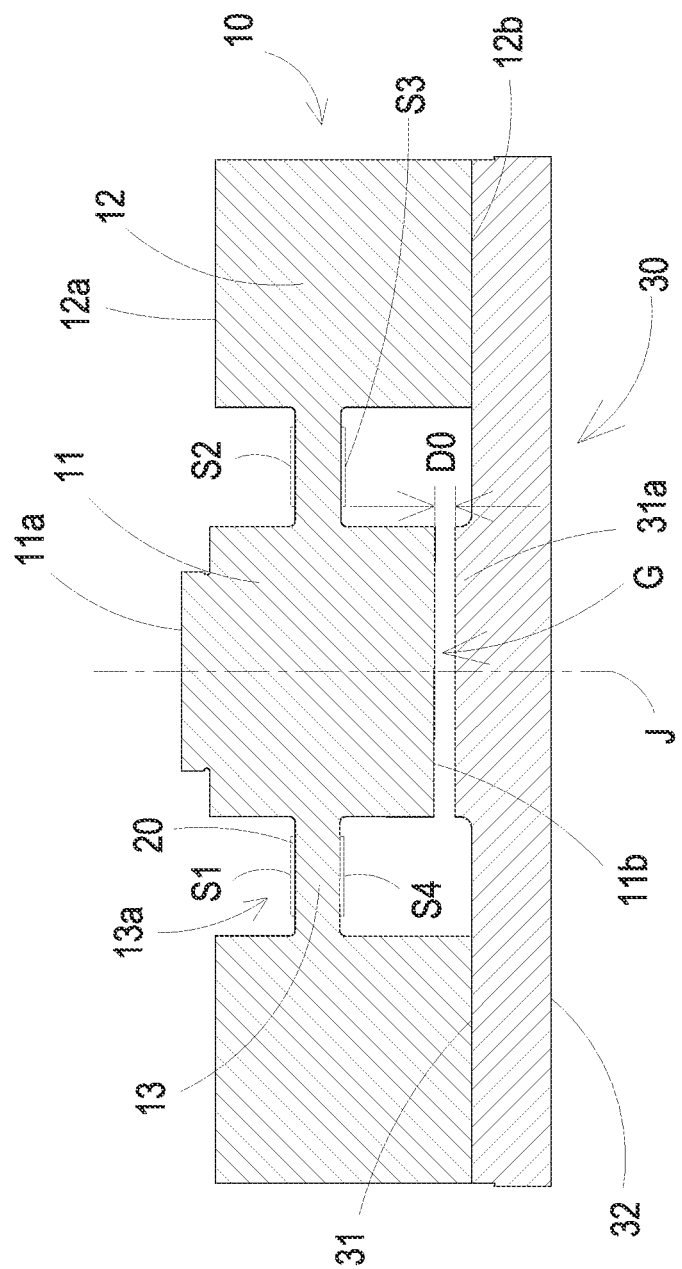
FIG. 1 is a schematic cross-sectional view illustrating a load cell according to a first embodiment of the present disclosure.
Figure 2:
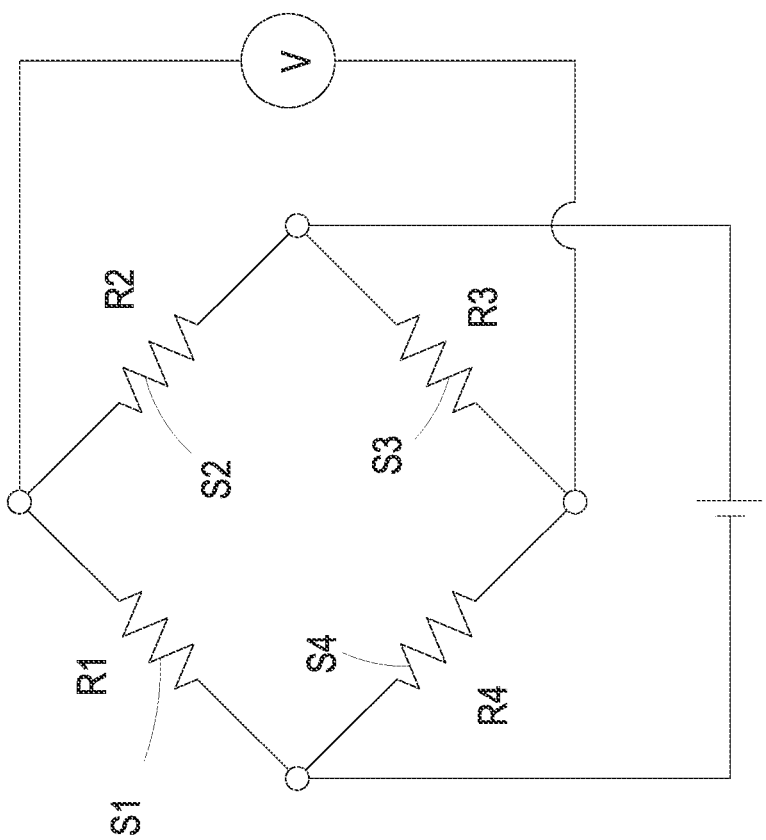
FIG. 2 is a circuit diagram of the load cell according to the first embodiment of the present disclosure.
Figure 3:
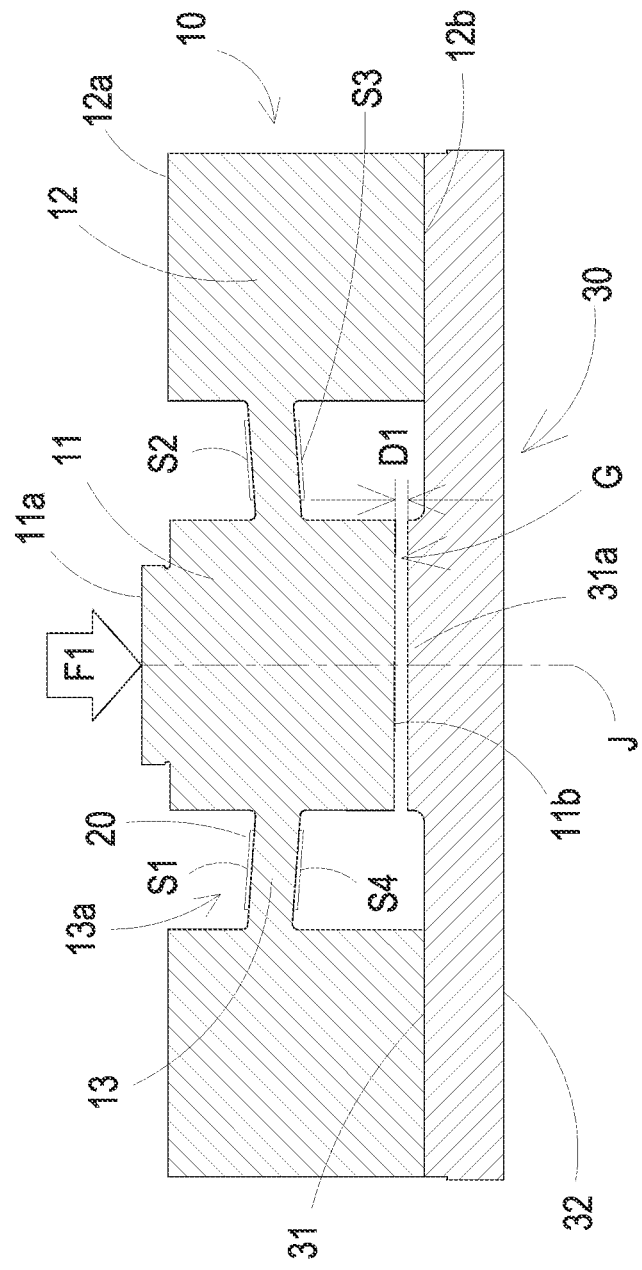
FIG. 3 shows the deformation of the load cell when a force is exerted on the load cell according to the first embodiment of the present disclosure.

Please refer to FIGS. 1 to 3. In a first embodiment of the present disclosure, a load cell 1 is provided and includes an elastic element 10, at least one strain gauge 20 and a limitation element 30. The elastic element 10 is disc-shaped and includes a first main body 11, a second main body 12 and a connection portion 13. The second main body 12 is disposed around an outer periphery of the first main body 11. The first main body 11 and the second main body 12 are concentric with each other. Preferably but not exclusively, the direction of the central axis J of the load cell 1 is parallel to the Z-axis direction. In that, the Z-axis is regarded as an axial direction. The connection portion 13 is connected between the first main body 11 and the second main body 12. In other words, each of the first main body 11, the second main body 12 and the connection portion 13 is formed in a ring shape, and the first main body 11, the connection portion 13 and the second main body 12 are sequentially disposed along a radial direction. In the embodiment, the first main body 11, the second main body 12 and the connection portion 13 are configured to form a first end portion 11a, a second end portion 12b and a deformation region 13a, respectively. Preferably but not exclusively, the first end portion 11a is a stressed end located at a top surface of the first main body 11, and the second end portion 12b is a mounted end located at a bottom surface of the second main body 12. In addition, the top surface (i.e., the first end portion 11a) of the first main body 11 is more convex than the top surface 12a of the second main body 12 to form a stepped structure, so that the first end portion 11a is served as the stressed end. The bottom surface (i.e., the second end portion 12b) of the second main body 12 is more convex than the bottom surface 11b of the first main body 11 to form a stepped structure, so that the second end portion 12b is served as the mounted end. In the embodiment, the first end portion 11a and the second end portion 12b are arranged along the axial direction. Preferably but not exclusively, the first end portion 11a and the second end portion 12b are two opposed surfaces. The deformation region 13a is located between the first end portion 11a and the second end portion 12b. Moreover, in the embodiment, the at least one strain gauge 20 is disposed in the deformation region 13a. Preferably but not exclusively, the deformation region 13a and the at least one strain gauge 20 are extended along a second direction such as the radial direction. The second direction such as the radial direction is parallel to the XY plane and different from the axial direction (i.e., the Z-axis direction). In the embodiment, the limitation element 30 is connected to the elastic element 10. A gap G is formed between the limitation element 30 and the elastic element 10 in the axial direction.

In the embodiment, the at least one strain gauge 20 is illustrated by four strain gauges S1 to S4. The four strain gauges S1 to S4 are secured on the top surface and the bottom surface of the connection portion 13, respectively. Preferably but not exclusively, the strain gauge S1 and the strain gauge S4 are two strain gauges spatially corresponding to each other, and are symmetrically disposed on the top surface and the bottom surface of the connection portion 13, respectively. Preferably but not exclusive, the strain gauge S2 and the strain gauge S3 are two strain gauges spatially corresponding to each other, and are symmetrically disposed on the top surface and the bottom surface of the connection portion 13, respectively. Preferably but not exclusively, the elastic element 10 of the load cell 1a is made of aluminum, alloy steel, or stainless steel. When the force F1 is exerted on the first end portion 11a of the load cell 1 in the first direction (i.e., the reverse of the Z-axis direction), the first main body 11 is moved relative to the second main body 12, the deformation region 13a formed on the connection portion 13 is slightly deformed, and unless overloaded, always returns to its original shape. As the deformation region 13a of the elastic element 10 deforms, the strain gauges S1 to S4 secured on the deformation region 13a also change shape, so that the force F1 exerted is measured and standardized under a specific range. In the embodiment, each strain gauge S1 to S4 is constructed by a wire or a foil, which is set up in a zigzag pattern and attached to the connection portion 13. In the embodiment, the four strain gauges S1 to S4 are set in a bridge circuit as shown in FIG. 2. When the shape of the strain gauges S1 to S4 is altered, a change in its electrical resistances R1 to R4 occurs. The resulting alteration to the electrical resistances R1 to R4 in the strain gauges S1 to S4 can be measured as voltage V. The change in voltage V is proportional to the amount of the force F1 exerted on the load cell 1, thus the amount of force can be calculated from the output of load cell 1.

In the embodiment, when a force F1 is exerted on the first end portion 11a in the first direction (i.e., the reverse of the Z-axis direction), the connection portion 13 in the deformation region 13a is deformed to drive the at least one strain gauge 20 to change shape. The force F1 is converted into an electrical signal, so that the force F1 is measured and standardized under a specific range. As the force F1 exerted on the load cell 1 increases, the electrical signal changes proportionally. Preferably but not exclusively, as the force F1 exerted on the first end portion 11a of the load cell 1, tension force stretches the strain gauges S3 and S4, and the wires of the strain gauges S3 and S4 get longer, so that it results in an increase in the electrical resistances R3 and R4. Compression force does the opposite. As the force F1 exerted on the first end portion 11a of the load cell 1, the strain gauges S1 and S2 are compressed, and the wires of strain gauges S1 and S2 get shorter, and the electrical resistances R1 and R2 are decreased. With the strain gauges S1 to S4 attached to the deformation region 13a of the elastic element 10, it facilitates the load cell 1 to mirror the minute changes to be measured. Moreover, the force F1 exerted thereon is measured and standardized under a specific range. Certainly, the present disclosure is not limited thereto.

On the other hand, in the embodiment, the top surface 31 of the limitation element 30 is connected to the second end portion 12b of the second main body 12 of the elastic element 10, and the top surface 31 of the limitation element 30 spatially corresponds to the bottom surface 11b of the first main body 11, so that a gap G is formed in the axial direction. In the embodiment, the gap G further includes a spaced distance D. When the force F1 is exerted on the first end portion 11a of the load cell 1 for example along the first direction such as the axial direction (i.e., the reverse of the Z-axis direction), the connection portion 13 of the elastic element 10 is subjected to deformation, and the spaced distance D of the corresponding gap G is gradually reduced. Until the spaced distance D of the gap G is disappeared, the force F1 under the specific range and exerted on the load cell 1 is measured by the load cell 1 accurately.

Figure 4:
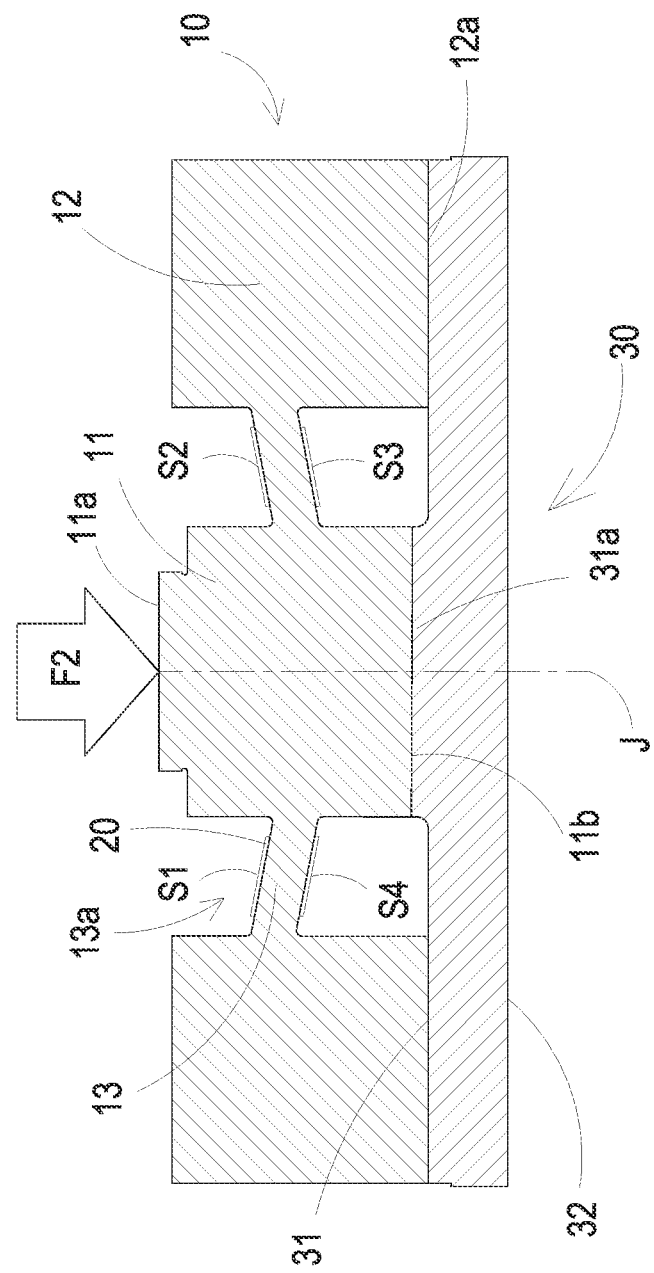
FIG. 4 shows the maximum deformation of the load cell when the load cell is overloaded according to the first embodiment of the present disclosure.
Figure 5:
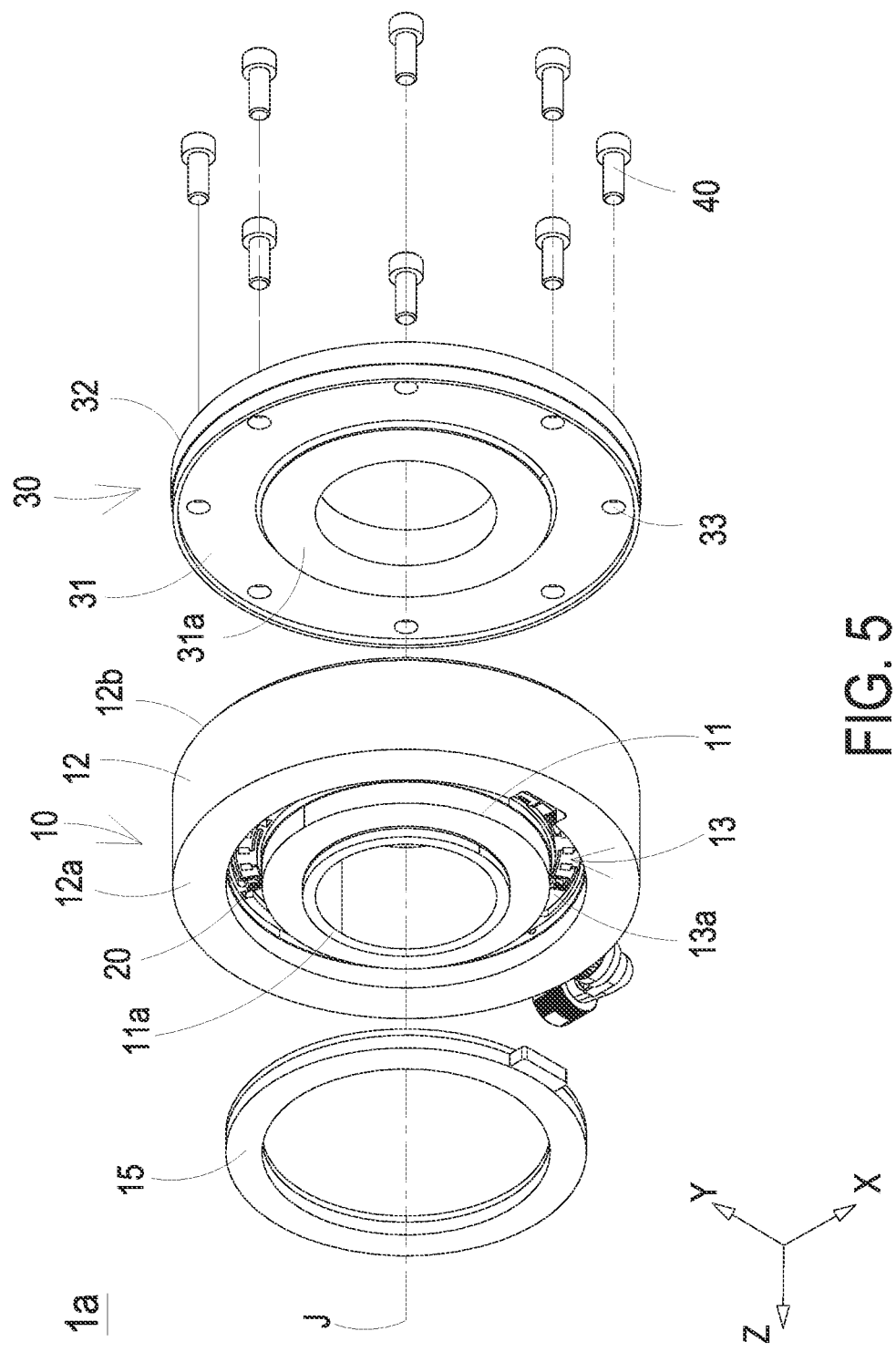
FIG. 5 is a schematic exploded view illustrating a load cell according to a second embodiment of the present disclosure.
Figure 6:
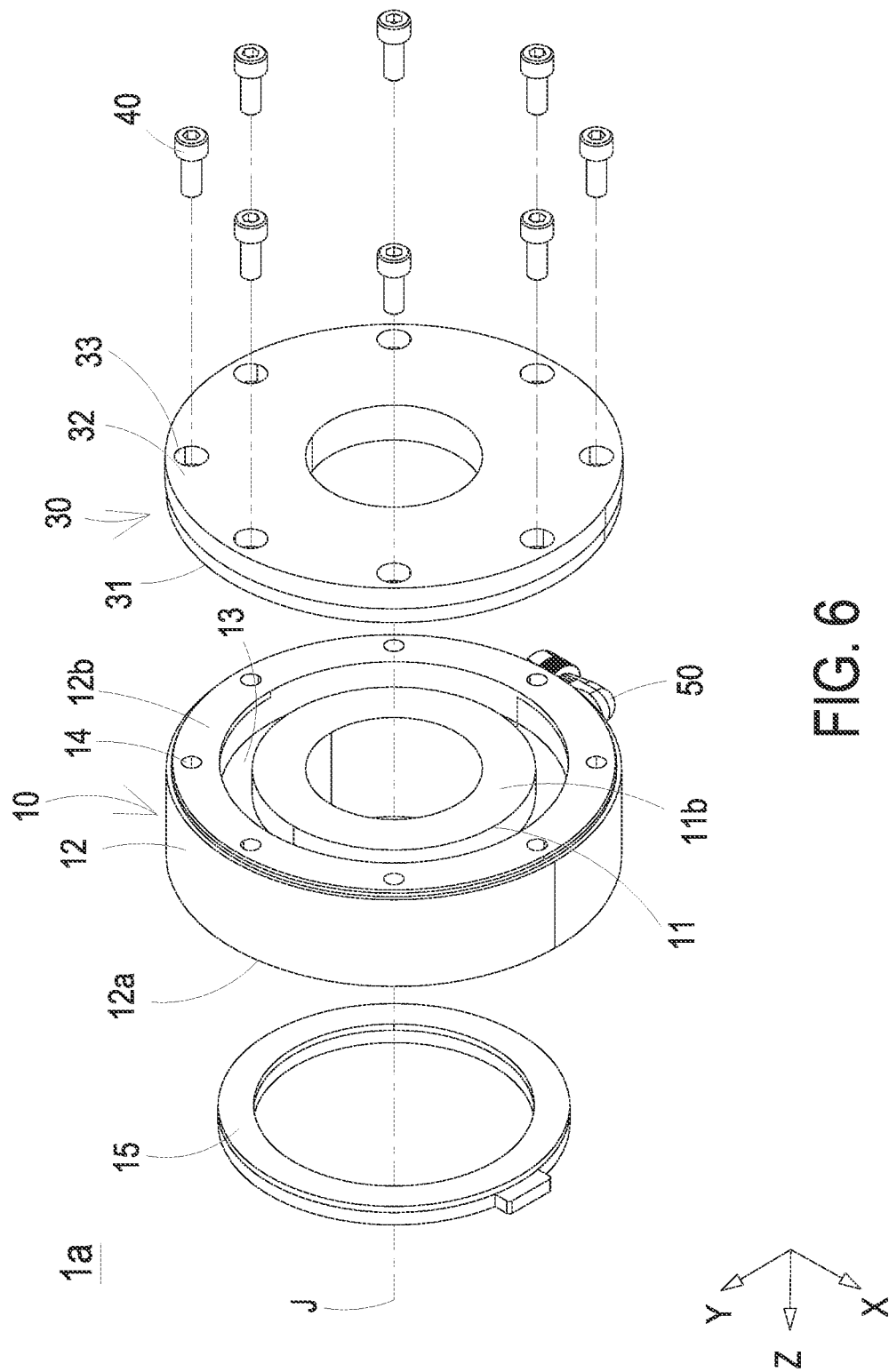
FIG. 6 is a schematic exploded view illustrating the load cell according to the second embodiment of the present disclosure and taken from another perspective angle.
Figure 7:
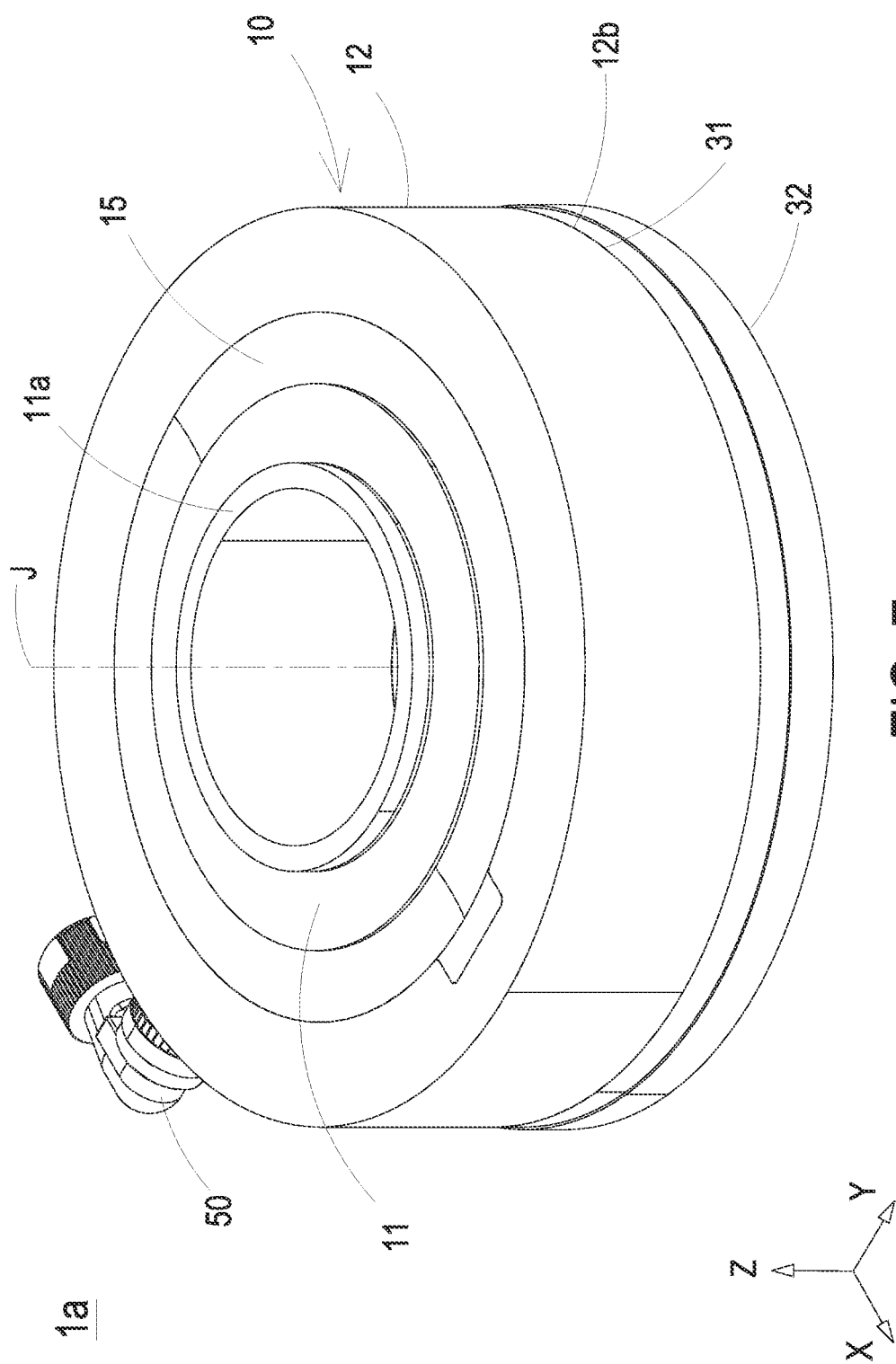
FIG. 7 is a schematic exterior view illustrating the load cell according to the second embodiment of the present disclosure.
Figure 8:
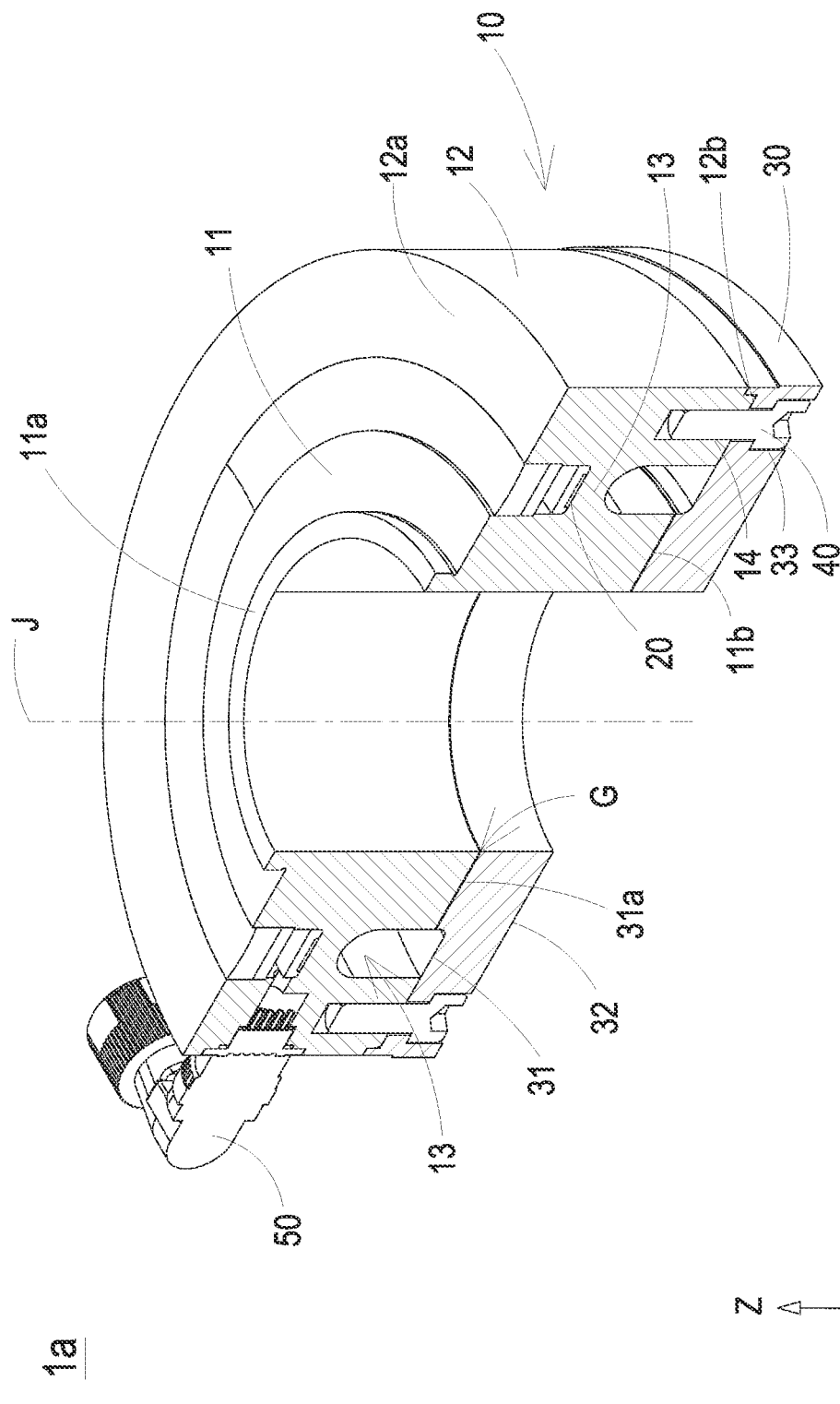
FIG. 8 shows a cross-sectional structure of the load cell according to the second embodiment of the present disclosure.
Figure 9:
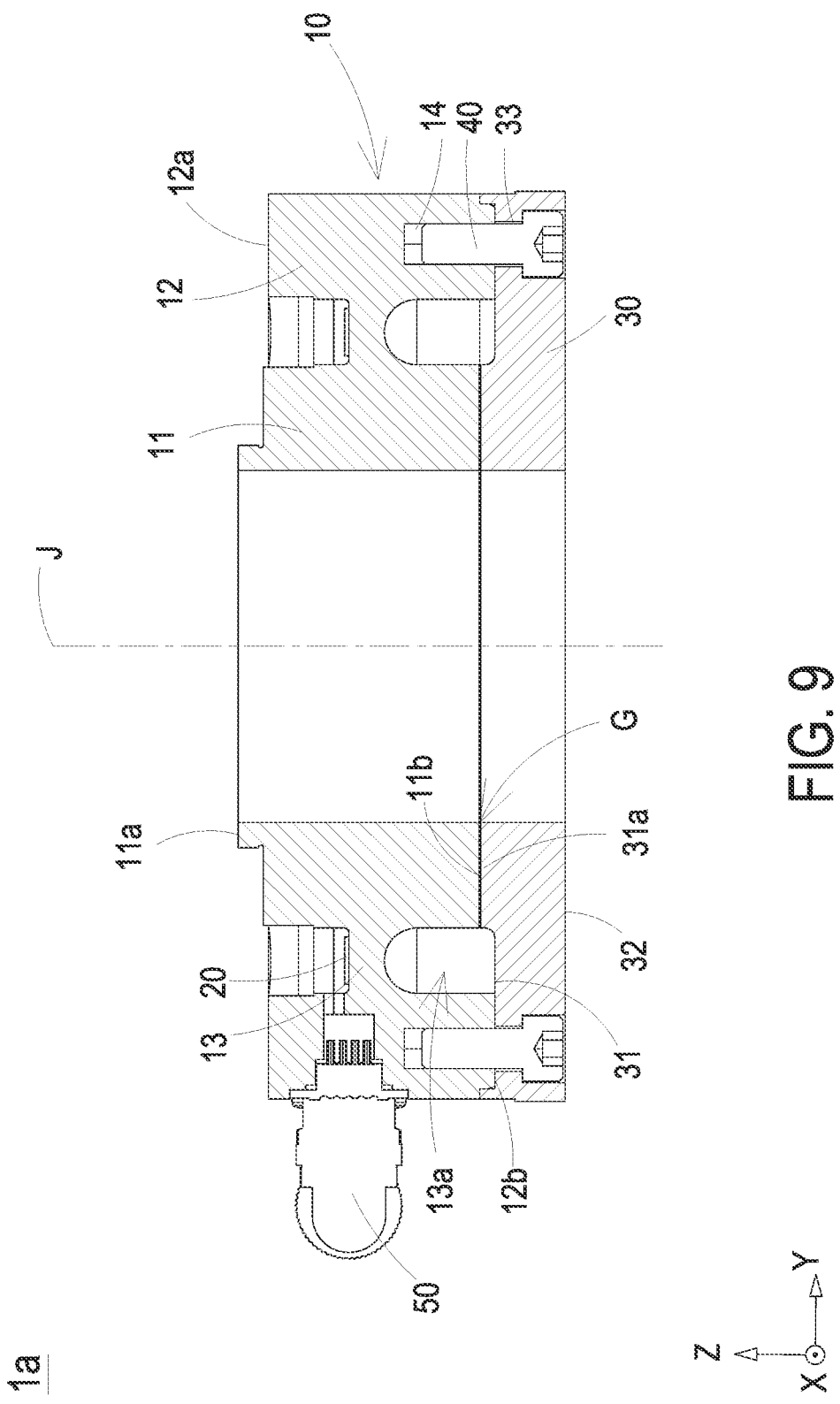
FIG. 9 is a schematic cross-sectional view illustrating the load cell according to the second embodiment of the present disclosure.
Figure 10:
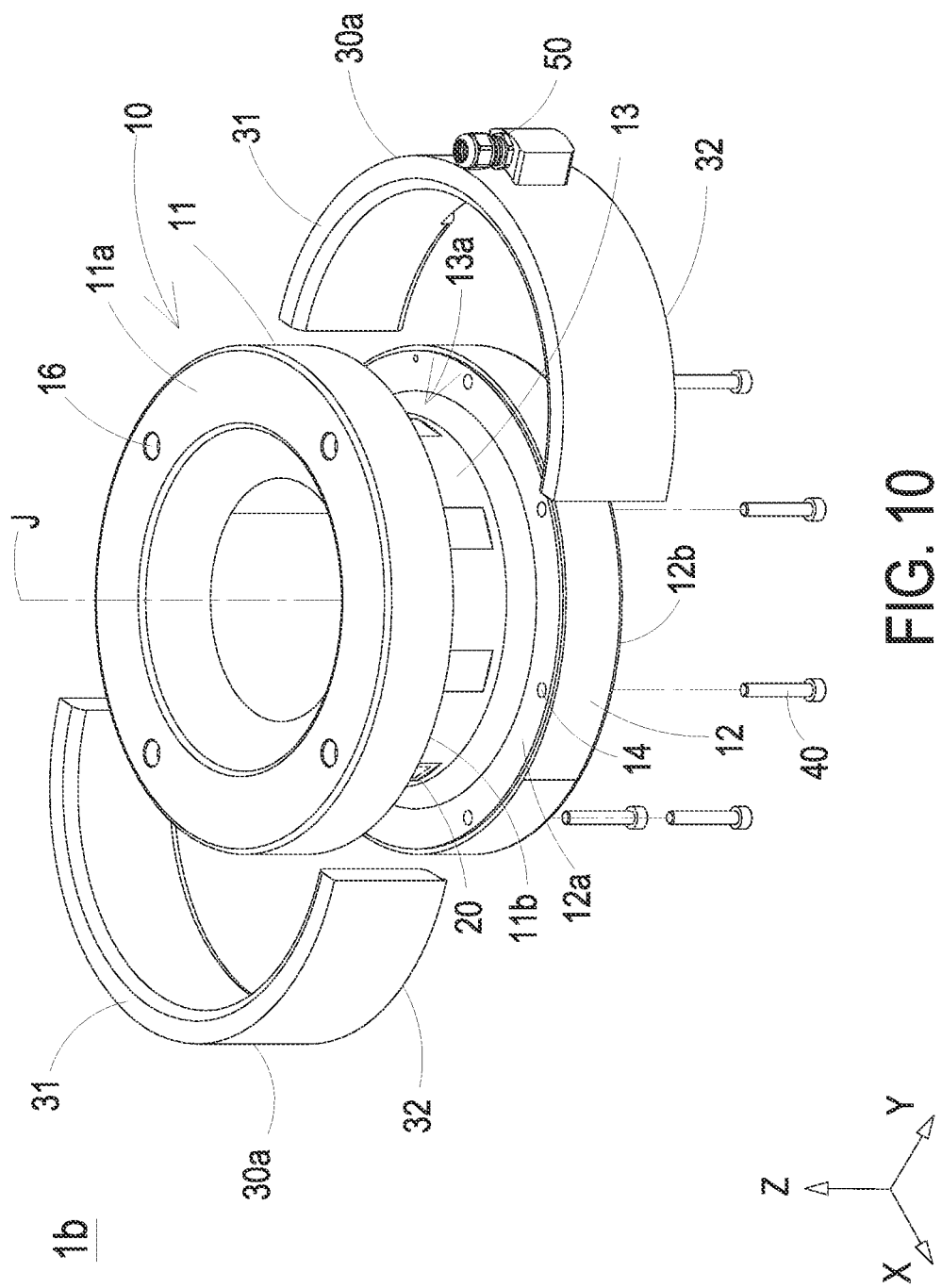
FIG. 10 is a schematic exploded view illustrating a load cell according to a third embodiment of the present disclosure.
Figure 11:
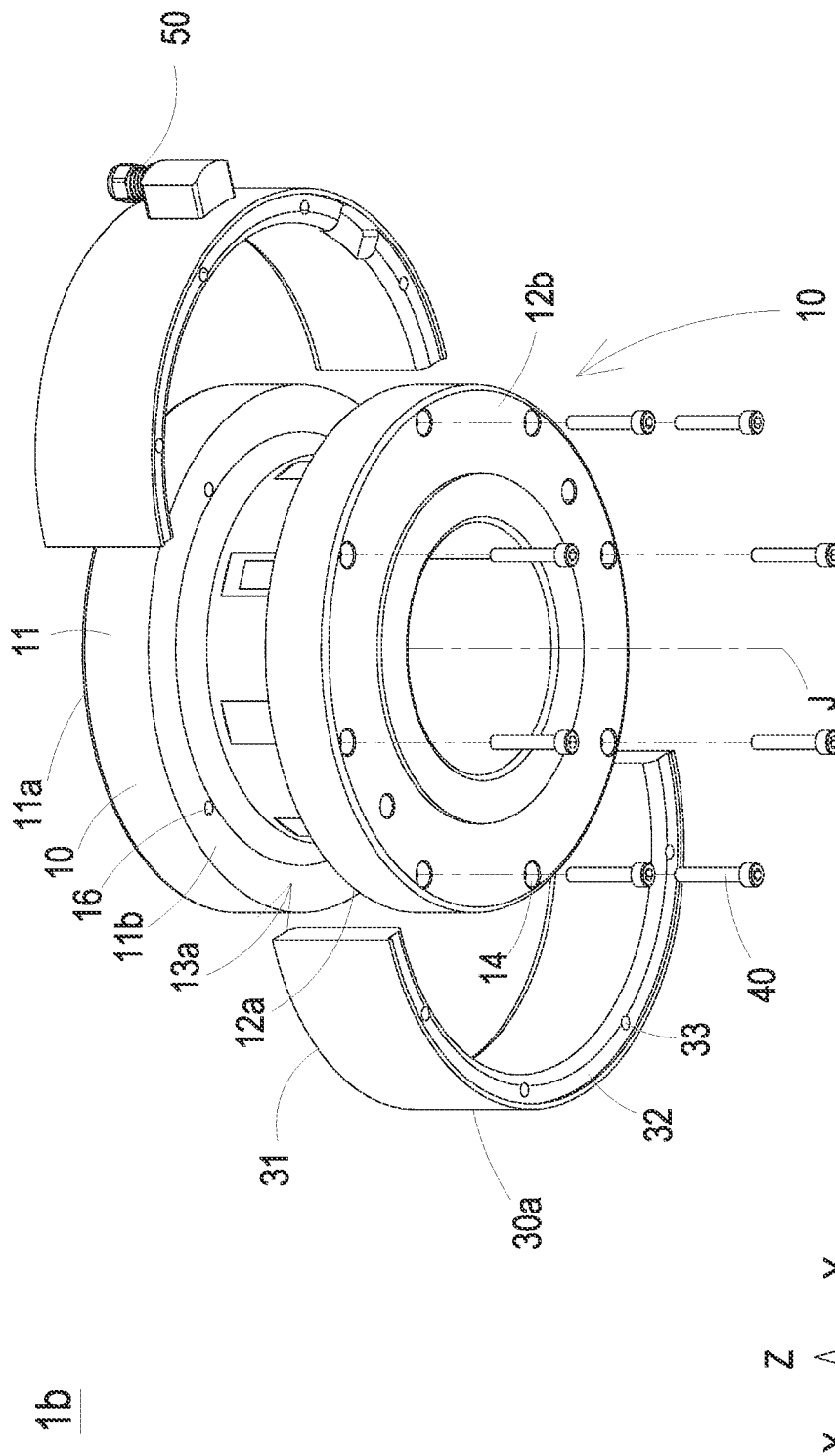
FIG. 11 is a schematic exploded view illustrating the load cell according to the third embodiment of the present disclosure and taken from another perspective angle.
Figure 12:
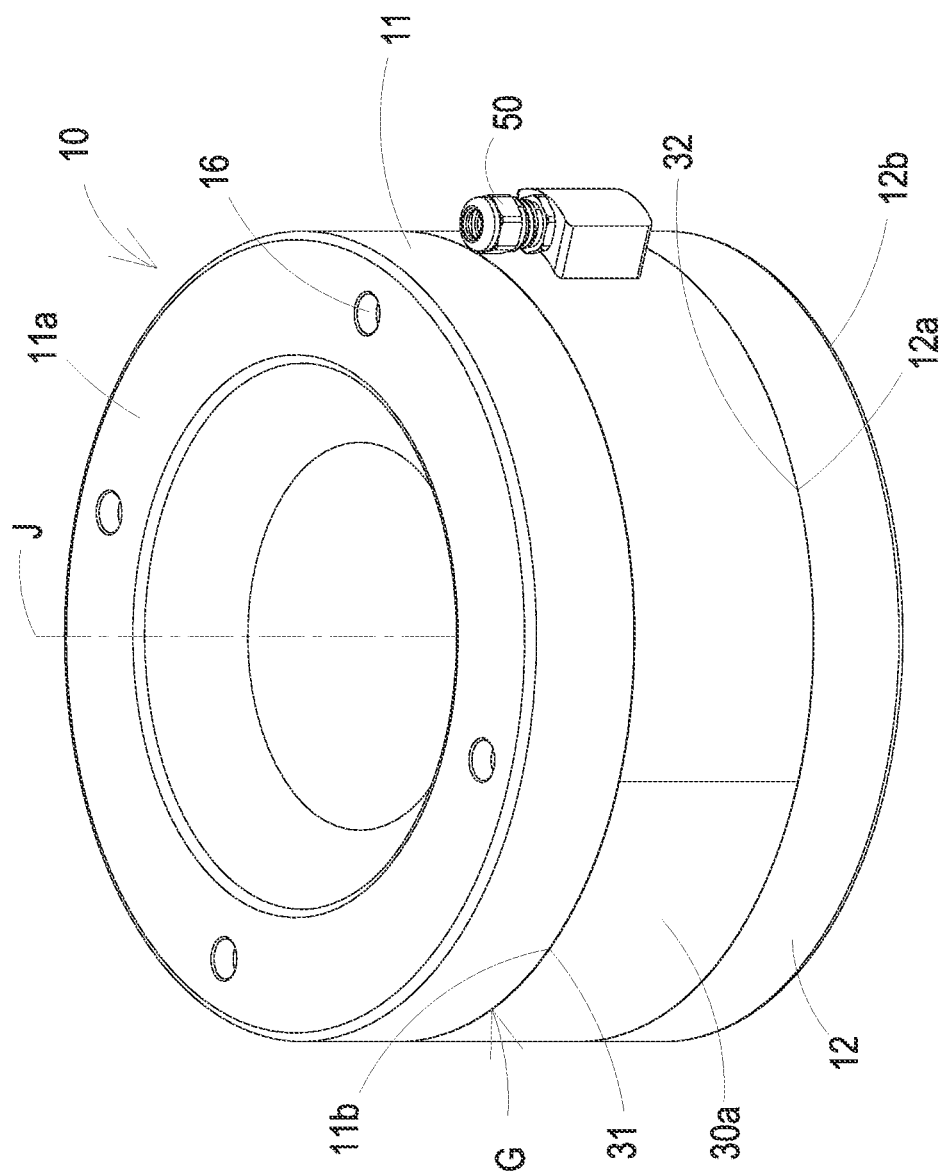
FIG. 12 is a schematic exterior view illustrating the load cell according to the third embodiment of the present disclosure.
Figure 13:
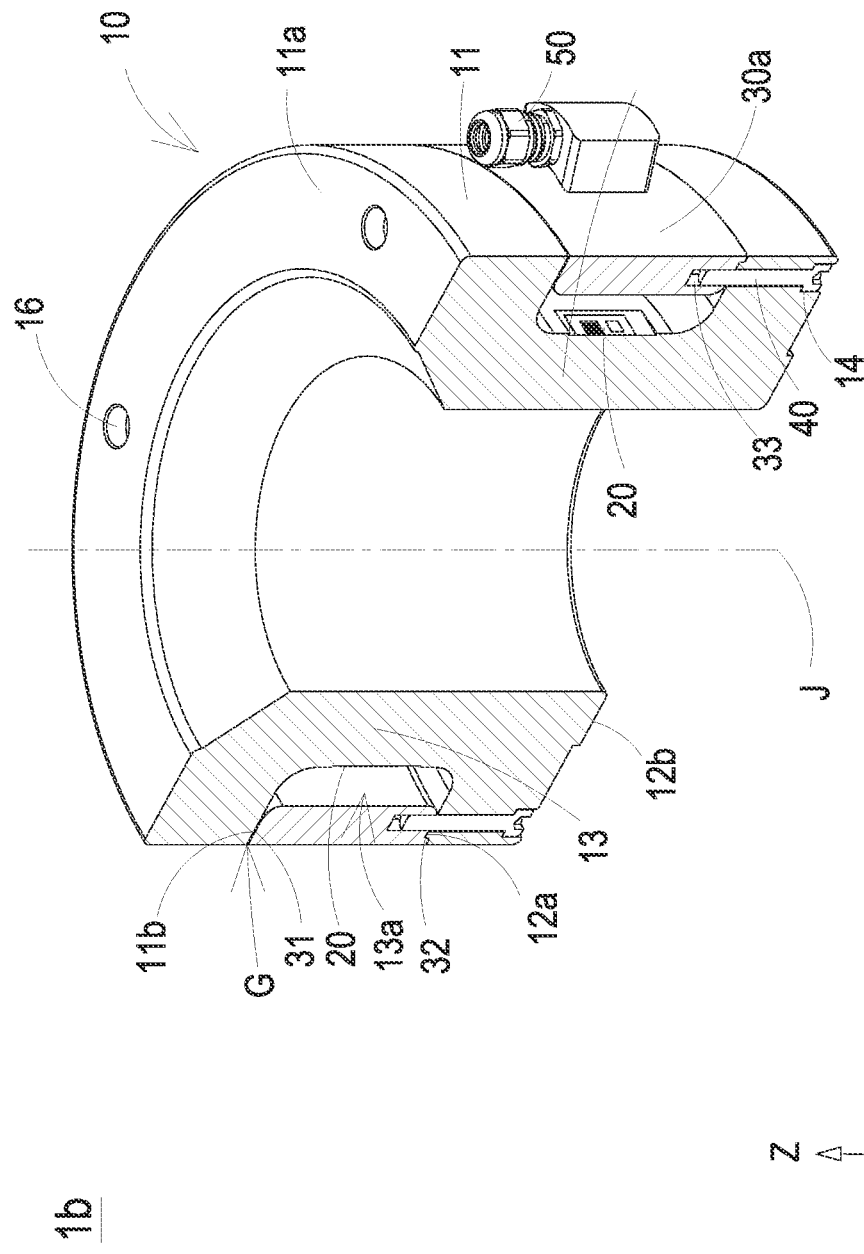
FIG. 13 shows a cross-sectional structure of the load cell according to the third embodiment of the present disclosure.
Figure 14:
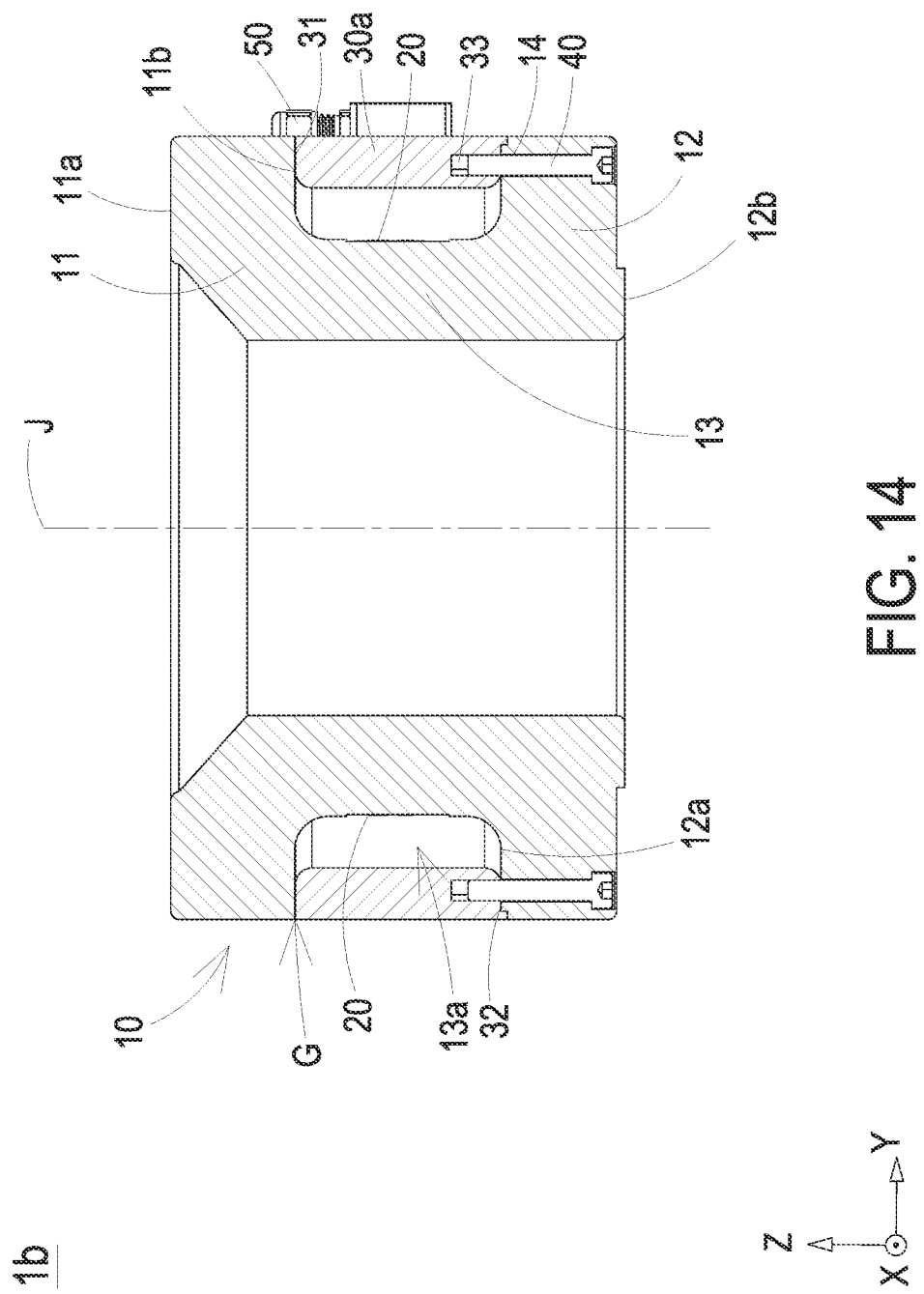
FIG. 14 is a schematic cross-sectional view illustrating the load cell according to the third embodiment of the present disclosure.

On the other hand, FIG. 4 shows the maximum deformation of the load cell when the load cell is overloaded according to the first embodiment of the present disclosure. When an excessive force F2 over the specific range is exerted on the load cell 1, the spaced distance D of the corresponding gap G is completely disappeared, and the bottom surface 11b of the first main body 11 is supported by the top surface 31 of the limitation element 30, so that the deformation of the elastic element 10 of the load cell 1 is limited in a certain space. In other words, the spaced distance D is inversely proportional to the force F1. When the spaced distance D in the gaps G is reduced to zero, the excessive force F2 is greater than the specific range, and the first main body 11 of the elastic element 10 is supported by the limitation element 30 to limit deformation of the elastic element 10. Preferably but not exclusively, the load cell 1 includes the gap G having the spaced distance D at 0.1 mm between the limitation element 30 and the elastic element 10, and is utilized to measure the force F1 under 20 tons.

Moreover, in the embodiment, the limitation element 30 further includes a protrusion 31a disposed on the top surface 31 and spatially corresponding to the bottom surface 11b of the first main body 11. The height of the protrusion 31a is adjustable according to the practical requirements, so as to achieve the required spaced distance D of the gap G. Certainly, the present disclosure is not limited thereto.

Please refer to FIGS. 5 to 9. In a second embodiment, the structures, elements and functions of the load cell 1a are similar to those of the load cell 1 in FIGS. 1 to 4. The elements and features indicated by the numerals similar to those of the foregoing embodiment mean similar elements and features, and are not redundantly described herein. In the embodiment, each of the first main body 11, the second main body 12 and the connection portion 13 is formed in a ring shape, and the first main body 11, the connection portion 13 and the second main body 12 are sequentially disposed along the radial direction and concentric with each other. Preferably but not exclusively, the first main body 11, the connection portion 13 and the second main body 12 are integrally formed into one piece by the same material. In the embodiment, the top surface (i.e., the first end portion 11a) of the first main body 11 is more convex than the top surface 12a of the second main body 12, so that the first end portion 11a of the load cell 1a is formed and served as the stressed end. The bottom surface (i.e., the second end portion 12b) of the second main body 12 is more convex than the bottom surface 11b of the first main body 11, so that the second end portion 12b is formed and connected to the top surface 31 of the limitation element 30. In addition, the bottom surface 11b of the first main body 11 is recessed from the bottom surface (i.e., the second end portion 12b) of the second main body 12, so as to form a stepped structure. It facilitates to form the gap G between the bottom surface 11b of the first main body 11 and the top surface 31 of the limitation element 30. In the embodiment, the bottom surface 32 of the limitation element 30 is served as the mounted end of the load cell 1a. In the embodiment, the first end portion 11a of the first main body 11 and the second end portion 12b of the second main body 12 are misaligned in the axial direction. Moreover, the gap G spatially corresponds to the first end portion 11a, and is formed between the bottom surface 11b of the first main body 11 and the top surface 31 of the limitation element 30. In the embodiment, the second end portion 12b of the second main body 12 further incudes a plurality of first fastened holes 14. The limitation element 30 includes a plurality of second fastened holes 33 passing through the top surface 31 and the bottom surface 32 and spatially corresponding to the first fastened holes 14. The load cell 1a further includes a plurality of fastening elements 40. Each of the fastening elements 40 is passing through and engaged with the corresponding second fastened hole 33 of the limitation element 30 and the corresponding first fastened hole 14 of the second main body 12, so as to connect the second end portion 12b of the second main body 12 with the top surface 31 of the limitation element 30. Moreover, the gap G is formed between the bottom surface 11b of the first main body 11 and the top surface 31 of the limitation element 30, and spatially corresponds to the first end portion 11a of the first main body 11 in the axial direction. In other embodiments, the elastic element 10 and the limitation element 30 are integrally formed into one piece, and made of aluminum, alloy steel, or stainless steel. The present disclosure is not limited thereto. In the embodiment, the plurality of strain gauges 20 are arranged radially in the deformation region 13a formed by the connection portion 13 and served as a bridge circuit, which is configured to convert the force F1 (Referring to FIG. 3) into an electrical signal. In the embodiment, the load cell 1a further includes an adapter 50. Preferably but not exclusively, the adapter 50 is disposed on the outer periphery of the second main body 12, electrically connected to the strain gauges 20 and configured to transmit the electronic signal converted from the force F1. Moreover, in the embodiment, the load cell 1a further includes a protective layer 15. Preferably but not exclusively, the protective layer 15 spatially corresponds to the deformation region 13a and the strain gauges 20, and covers the strain gauges 20 so that the strain gauges 20 are not exposed. It is advantageous of protecting the strain gauges 20 from being damaged by moisture or dust. Certainly, the present disclosure is not limited thereto.

In the embodiment, each gap G includes a spaced distance D in the axial direction. When the force F1 (Referring to FIG. 3) is exerted on the first end portion 11a of the load cell 1a for example along the first direction (i.e., the reverse of the Z-axis direction), the connection portion 13 of the elastic element 10 is subjected to deformation, and the spaced distance D of the corresponding gap G is gradually reduced. Until the spaced distance D of the gap G is disappeared, the force F1 under the specific range and exerted on the load cell 1a is measured by the load cell 1a accurately. On the other hand, when an excessive force F2 (Referring to FIG. 4) over the specific range is exerted on the load cell 1a, the spaced distance D of the corresponding gap G is completely disappeared, and the bottom surface 11b of the first main body 11 is supported by the top surface 31 of the limitation element 30, so that the deformation of the elastic element 10 of the load cell 1a is limited in a certain space. In other words, the spaced distance D is inversely proportional to the force F1. When the spaced distance D in the gaps G is reduced to zero, the excessive force F2 is greater than the specific range, and the first main body 11 of the elastic element 10 is supported by the limitation element 30 to limit deformation of the elastic element 10. Preferably but not exclusively, the load cell 1a includes the gap G having the spaced distance D at 0.1 mm between the limitation element 30 and the elastic element 10, and is utilized to measure the force F1 under 20 tons. Furthermore, with the design of the gap G disposed between the limitation element 30 and the first main body 11 of the elastic element 10, an excessive force more than 20 tons exerted on the load cell 1a is affordable without damaging the elastic element 10 of the load cell 1a. Under the effect of supporting and limiting displacement through the limitation element 30, it prevents the elastic element 10 of the load cell 1a from being damaged due to excessive force deformation. In other embodiments, the profiles of the first main body 11, the connection portion 13 and the second main body 12 of the elastic element 10 and the limitation element 30 are adjustable according to the practical requirements. The present disclosure is not limited thereto.

Please refer to FIGS. 10 to 14. In a third embodiment, the structures, elements and functions of the load cell 1b are similar to those of the load cell 1a in FIGS. 5 to 9. The elements and features indicated by the numerals similar to those of the foregoing embodiment mean similar elements and features, and are not redundantly described herein. In the embodiment, the first main body 11 and the second main body 12 are stacked in the axial direction (i.e., the Z-axis direction) and concentric with each other. Preferably but not exclusively, the direction of the central axis J of the load cell 1b is parallel to the Z-axis direction. Namely, the Z-axis is regarded as the axial direction. In the embodiment, the connection portion 13 is connected between the first main body 11 and the second main body 12. The first end portion 11a and the second end portion 12b are formed on the top surface of the first main body 11 and the bottom surface 11b of the second main body 12, respectively, and the deformation region 13a is formed on the connection portion 13. In addition, the first end portion 11a of the first main body 11 is served as the stressed end of the load cell 1b, and the second end portion 12b of the second main body 12 is served as the mounted end of the load cell 1b. The bottom surface 11b of the first main body 11 and the top surface 12a of the second main body 12 are connected to two opposed ends of the connection portion 13, respectively, so that the deformation region 13a is formed between the bottom surface 11b of the first main body 11 and the top surface 12a of the second main body 12. In the embodiment, the first end portion 11a and the second end portion 12b are opposed to each other in the axial direction, and the gap G is located between the first end portion 11a and the second end portion 12b. In the embodiment, the deformation region 13a and the at least one strain gauge 20 are extended along the axial direction (i.e., the Z-axis direction).

In the embodiment, the second main body 12 further incudes a plurality of first fastened holes 14 passing through the top surface 12a and the second end portion 12b of the second main body 12. The limitation element 30a includes a plurality of second fastened holes 33 disposed on the bottom surface 32 and spatially corresponding to the first fastened holes 14. The load cell 1b further includes a plurality of fastening elements 40. Each of the fastening elements 40 is passing through and engaged with the corresponding first fastened hole 14 of the second main body 12 and the corresponding second fastened hole 33 of the limitation element 30a, so as to connect the second end portion 12b of the second main body 12 with the bottom surface 32 of the limitation element 30a. Moreover, the gap G is formed between the bottom surface 11b of the first main body 11 and the top surface 31 of the limitation element 30a, and spatially corresponds to the first end portion 11a of the first main body 11 and the second end portion 12b of the second main body 12 in the axial direction. In other embodiments, the elastic element 10 and the limitation element 30a are integrally formed into one piece, and made of aluminum, alloy steel, or stainless steel. The present disclosure is not limited thereto. In the embodiment, the plurality of strain gauges 20 are arranged radially in the deformation region 13a formed by the connection portion 13, and staggered with each other. The plurality of strain gauges 20 are served as a bridge circuit, which is configured to convert the force F1 (Referring to FIG. 3) into an electrical signal. In the embodiment, the load cell 1b further includes an adapter 50. Preferably but not exclusively, the adapter 50 is disposed on the outer periphery of the second main body 12, electrically connected to the strain gauges 20 and configured to transmit the electronic signal converted from the force F1. Moreover, in the embodiment, the first main body 11 further includes a plurality of through holes 16 passing through the first end portion 11a and the bottom surface 11b thereof and in fluid communication with the outer periphery of the connection portion 13. After the elastic element 10, the strain gauges 20 and the limitation element 30a are assembled, a sealant (not shown) is filled through the through holes 16 to cover the strain gauges 20 in the deformation region 13a, and the strain gauges 20 are not exposed. It is advantageous of protecting the strain gauges 20 from being damaged by moisture or dust. Certainly, the present disclosure is not limited thereto.

In the embodiment, each gap G includes a spaced distance D in the axial direction. When the force F1 (Referring to FIG. 3) is exerted on the first end portion 11a of the load cell 1b for example along the first direction (i.e., the reverse of the Z-axis direction), the connection portion 13 of the elastic element 10 is subjected to deformation, and the spaced distance D of the corresponding gap G is gradually reduced. Until the spaced distance D of the gap G is disappeared, the force F1 under the specific range and exerted on the load cell 1b is measured by the load cell 1b accurately. On the other hand, when an excessive force F2 (Referring to FIG. 4) over the specific range is exerted on the load cell 1b, the spaced distance D of the corresponding gap G is completely disappeared, and the bottom surface 11b of the first main body 11 is supported by the top surface 31 of the limitation element 30a, so that the deformation of the elastic element 10 of the load cell 1b is limited in a certain space. In other words, the spaced distance D is inversely proportional to the force F1. When the spaced distance D in the gaps G is reduced to zero, the excessive force F2 is greater than the specific range, and the first main body 11 of the elastic element 10 is supported by the limitation element 30a to limit deformation of the elastic element 10. Preferably but not exclusively, the load cell 1b includes the gap G having the spaced distance D at 0.1 mm between the limitation element 30 and the elastic element 10, and is utilized to measure the force F1 under 200 tons. Furthermore, with the design of the gap G disposed between the limitation element 30a and the first main body 11 of the elastic element 10, an excessive force more than 200 tons exerted on the load cell 1b is affordable without damaging the elastic element 10 of the load cell 1b. Under the effect of supporting and limiting displacement through the limitation element 30a, it prevents the elastic element 10 of the load cell 1a from being damaged due to excessive force deformation. In other embodiments, the profiles of the first main body 11, the connection portion 13 and the second main body 12 of the elastic element 10 and the limitation element 30a are adjustable according to the practical requirements. The present disclosure is not limited thereto.

From the above descriptions, the present disclosure provides a disc-type load cell capable of measuring a loading force under a specific range, and preventing the load cell from being damaged by irreversible permanent deformation due to overload. In order to avoid the irreversible permanent deformation and the material damage of the load cell due to overload, a limitation element with a special design is introduced into the structure of the load cell, and a gap is formed between the limitation element and the elastic element, so that the load cell is deformed in a specific space. Under the effects of the support of the limitation element and the limited displacement of the gap, it prevents the load cell from being damaged due to overload deformation. In addition, since the gap spatially corresponds to the strain gauge secured on the elastic element, when a sealant is filled into the gap to cover the strain gauge, it is helpful of protecting the strain gauge from being damaged by moisture or dust.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A load cell comprising:
an elastic element comprising a first end portion, a second end portion, a deformation region, a first main body, a second main body and a connection portion, wherein the first end portion and the second end portion are arranged along an axial direction and opposed to each other, and the deformation region is located between the first end portion and the second end portion, wherein the first main body, the connection portion and the second main body are stacked in the axial direction, wherein the first main body and the second main body are concentric with a central axis, and the central axis is parallel to the axial direction, wherein a projection of the first main body and a projection of the connection portion along the axial direction are at least partially overlapped with each other, and a projection of the second main body and the projection of the connection portion along the axial direction are at least partially overlapped with each other;
at least one strain gauge disposed in the deformation region, wherein when a force is exerted on the first end portion in a first direction, the deformation region is deformed to drive the at least one strain gauge to change shape, so that the force is measured and standardized under a specific range; and
a limitation element connected to the elastic element, wherein a gap is formed between the limitation element and the elastic element.

2. The load cell according to claim 1, wherein the deformation region and the at least one strain gauge are arranged along a second direction, and the second direction is different from the first direction.

3. The load cell according to claim 1, wherein the deformation region and the at least one strain gauge are extended along the axial direction.

4. The load cell according to claim 1, wherein the connection portion is connected between the first main body and the second main body, wherein the first end portion and the second end portion are formed on the first main body and the second main body, respectively, and the deformation region is formed on the connection portion.

5. The load cell according to claim 4, wherein each of the first main body, the second main body and the connection portion is formed in a ring shape.

6. The load cell according to claim 4, wherein the first end portion is a stressed end located at a top surface of the first main body, and the second end portion is a mounted end located at a bottom surface of the second main body.

7. The load cell according to claim 4, wherein the first end portion and the second end portion are opposed to each other in the axial direction, and the gap is located between the first end portion and the second end portion.

8. The load cell according to claim 1, wherein the at least one strain gauge comprises a plurality of strain gauges arranged radially in the deformation region and served as a bridge circuit, which is configured to convert the force into an electrical signal.

9. The load cell according to claim 1, wherein the gap comprises a spaced distance, and the spaced distance is inversely proportional to the force, wherein when the spaced distance is reduced to zero, the force is greater than the specific range, and the elastic element is supported by the limitation element to limit deformation of the deformation region.

10. A load cell comprising:
a first main body comprising a first end portion;
a second main body comprising a second end portion;
a connection portion connected between the first main body and the second main body and comprising a deformation region, wherein the first end portion and the second end portion are arranged along an axial direction;
at least one strain gauge disposed in the deformation region, wherein when a force is exerted on the first end portion in a first direction, the deformation region is deformed to drive the at least one strain gauge to change shape, so that the force is measured and standardized under a specific range, wherein the first main body, the connection portion and the second main body are stacked in the first direction, wherein a projection of the first main body and a projection of the connection portion along the first direction are at least partially overlapped with each other, and a projection of the second main body and the projection of the connection portion along the first direction are at least partially overlapped with each other; and
a limitation element connected to the second main body, wherein a gap is formed between the limitation element and the first main body.

11. The load cell according to claim 10, wherein each of the first main body, the second main body and the connection portion is formed in a ring shape.

12. The load cell according to claim 10, wherein the first end portion is a stressed end located at a top surface of the first main body, and the second end portion is a mounted end located at a bottom surface of the second main body, and the gap is located between the first end portion and the second end portion.

13. The load cell according to claim 10, wherein the at least one strain gauge comprises a plurality of strain gauges arranged radially in the deformation region and served as a bridge circuit, which is configured to convert the force into an electrical signal.

14. The load cell according to claim 10, wherein the gap comprises a spaced distance, and the spaced distance is inversely proportional to the force, wherein when the spaced distance is reduced to zero, the force is greater than the specific range, and the first main body is supported by the limitation element to limit deformation of the deformation region.

* * * * *